United States Patent [19]
Izumi

[11] 3,911,793
[45] Oct. 14, 1975

[54] FLUID PRESSURE TO MECHANICAL ROTATIONAL POSITION CONVERTING MECHANISM

[75] Inventor: Masao Izumi, Tokyo, Japan

[73] Assignee: Nissan Motor Company Limited, Japan

[22] Filed: June 1, 1973

[21] Appl. No.: 365,963

[30] Foreign Application Priority Data
June 3, 1972   Japan.............................. 47-54791

[52] U.S. Cl.......................................... 92/33; 92/99
[51] Int. Cl.² .......................................... F01B 3/00
[58] Field of Search........................... 92/31, 33, 99

[56] References Cited
UNITED STATES PATENTS

| | | | |
|---|---|---|---|
| 2,553,632 | 5/1951 | Clark.................................... | 92/33 X |
| 2,883,144 | 4/1959 | Kendig.................................. | 92/31 X |
| 2,953,166 | 9/1960 | Carlson, Jr........................... | 92/31 X |
| 3,207,468 | 9/1965 | Lauducci et al..................... | 92/31 X |
| 3,388,603 | 6/1968 | Clark.................................... | 92/33 X |
| 3,450,382 | 6/1969 | Calim................................... | 92/31 X |
| 3,477,345 | 11/1969 | Johnson............................... | 92/31 X |
| 3,722,371 | 3/1973 | Boyle.................................... | 92/31 |

*Primary Examiner*—Martin P. Schwadron
*Assistant Examiner*—Abraham Hershkovitz
*Attorney, Agent, or Firm*—Robert E. Burns; Emmanuel J. Lobato; Adams Bruce L.

[57] ABSTRACT

A mechanism comprises a diaphragm and a cam in which a rotary output shaft is continuously oriented at an angular position which is a predetermined function of the pressure or pressures of one or more fluids supplied to the mechanism. The cam is enclosed by a stationary sleeve and prevented from axial movement relative the sleeve by spherical members operatively connecting the cam to the sleeve.

2 Claims, 4 Drawing Figures

FLUID PRESSURE TO MECHANICAL ROTATIONAL POSITION CONVERTING MECHANISM

This invention relates to a mechanism for converting an input in the form of hydraulic or pneumatic pressure into an analogous mechanical linear position, and thereafter into an analogous mechanical rotational position. Such a mechanism is particularly suited for use with a flap valve, the flap of which pivots or swings about an axis.

Several types of such a device are already known, a typical one of which utilizes a crank mechanism. A fluid pressure input is applied to a diaphragm, the output shaft of which moves axially in response to the level of pressure, and is secured to a crank arm through a linkage member. The crank arm is pivotal about a crankshaft to which an output device or member such as flap valve is connected. Thus linear mechanical movement of the diaphragm is converted into a rotational output through the linkage member and the crank in response to the level of pressure applied to the diaphragm.

It will be noticed that a device of this configuration requires a considerable amount of space for accommodating at least the length of the linkage member and a circle with a radius of the crank arm length. Another disadvatage is that the movable member is located more or less remotely from the diaphragm, and the entire mechanism is relatively bulky. It is also inherent in this configuration that the movable member is allowed to rotate only within a range of 180°. Moreover, as the angle between the linkage member and the crank arm increases, the force applied by the linkage member required to rotate the crank arm also increases. For these reasons and others, a crank mechanism is impractical for use in this type of device.

It is therefore an object of the present invention to provide a fluid pressure to rotational position converting mechanism which overcomes the shortcomings of known devices as described above, and allows a wider range of useful applications.

Another object of the invention is to provide a device which first converts a hydraulic or pneumatic pressure input into a mechanical linear position along an axis, and then converts the linear position into a rotational position about the same axis.

Other objects of the invention are simplicity in construction, ease and economy in manufacture, and dependability and operability in practical use.

Other objects and features will be apparent from the following description with reference to the accompanying drawings, in which.

Figure 1:
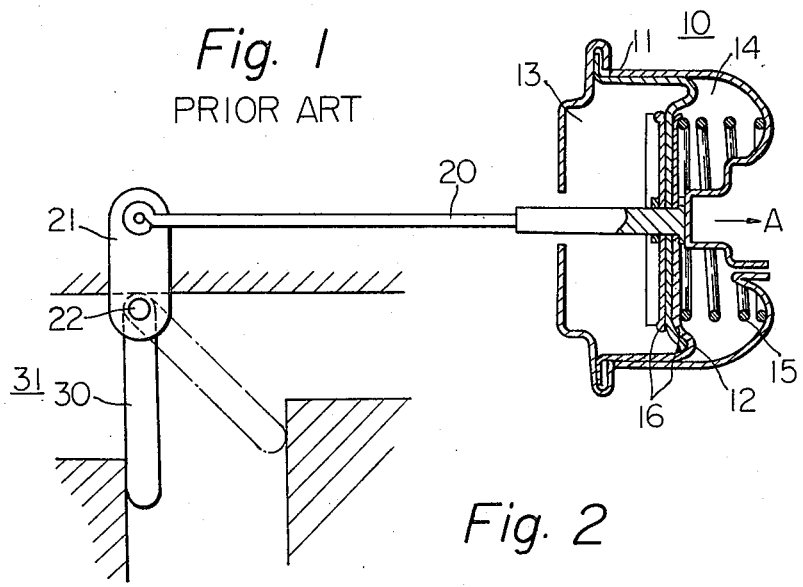
FIG. 1 is a schematic side view, partly in section, showing an example of known fluid pressure to rotational position converting mechanism.

Shown in FIG. 1 is a prior art mechanism of the type mentioned above. Since such a mechanism is most frequently used with a flap valve which controls the opening and closing of a vent passage for an air conditioning system of a motor vehicle, FIG. 1 shows an example of this application. In the drawing, numeral 10 generally represents a diaphragm assembly. The diaphragm assembly 10 typically comprises a diaphragm 12, an air chamber 13 and a vacuum chamber 14 separated from each other by the diaphragm 12 and a spring 15 biasing the diaphragm 12 toward the air chamber 13. The air chamber 13 communicates with the ambient atmosphere, and the vacuum chamber 14 can be either vented to the atmosphere or connected to a vacuum source by suitable means (not shown). A linkage member 20 is connected to the diaphragm 12 through bearing plates 16 and extends outwardly through a housing 11 of the diaphragm assembly 10. The far end of the linkage member 20 is attached to one end of a crank arm 21. The other end of the crank arm 21 is attached to a rotary shaft 22 to which a flap value 30 is secured. When vacuum is supplied into the vacuum chamber 14 the diaphragm 12 and the linkage member 20 are moved in a direction indicated by an arrow A overcoming the force of the spring 15, thus rotating the crank arm 21 and flap valve 30 in a clockwise direction. The flap valve 30 which was initially positioned as indicated in phantom outline is moved to a solid outlined position. The flap valve 30 thus closes a vent passage 31 at this position. When the vacuum chamber 14 is again vented to the atmosphere the diaphragm 12 is forced by the spring 15 in a direction opposite to the arrow A, and therefore the flap vale 30 is moved to its initial position by the linkage member 20 and crank arm 21. It is obvious that the drawbacks already described are inherent in the mechanism of FIG. 1.

Figure 2:
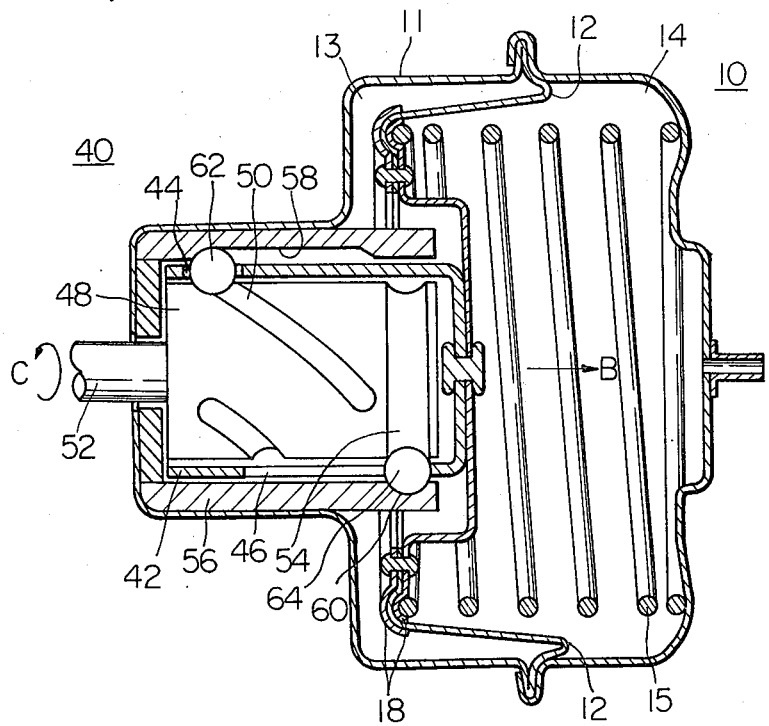
FIG. 2 is a side view, partly in section illustrating a preferred embodiment of a fluid pressure to rotational position converting mechanism according to the present invention.
Figure 3:
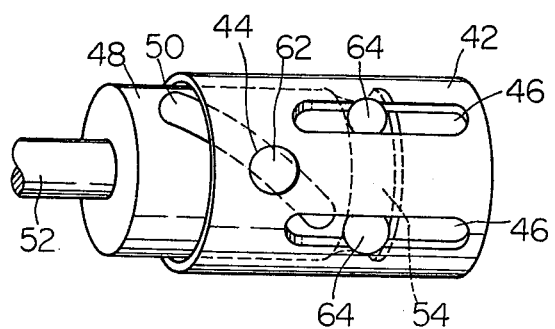
FIG. 3 is a perspective view showing a part of the mechanism of FIG. 2.
Figure 4:
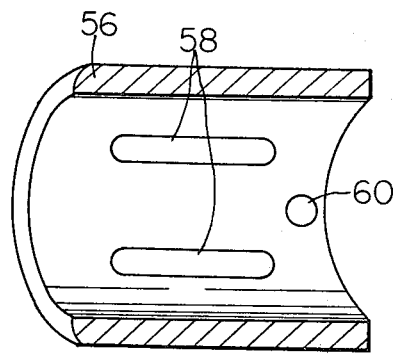
FIG. 4 is a fragmentary view of a part of the mechanism shown in FIG. 2.

FIG. 2 illustrates one embodiment of a mechanism according to the present invention. Herein is again utilized a diaphragm assembly in which atmospheric pressure and vacuum are supplied to the diaphragm, although other types of gas or liquid can be used for the purpose. Since the operation of the diaphragm assembly is similar to that of FIG. 1, detailed explanation thereof is omitted for simplicity. The same numerals as used in FIG. 1 apply to like and corresponding parts of the diaphragm assembly of FIG. 2. In the drawing, generally indicated as 40 is a cam mechanism which is enclosed in a common housing 11 with the diaphragm assembly 10. A numeral 42 represents a cam driver which is generally tubular. The cam driver 42 is closed at an axial end adjacent the diaphragm 12, the closed end being connected to the diaphragm through a plurality of connecting members 18. Thus the cam driver 42 is axially movable with the diaphragm 12 in response to pressure variations applied thereto. A cylindrical cam 48 is slidably received within the cam driver 42. To an axial end of the cam 48 opposite to the diaphragm 12, a shaft 52 is connected which extends externally from the housing 11 through an opening (no numeral). A flap valve as shown in FIG. 1 or any other output device or movable member is connected to the shaft 52 to rotate therewith, though not shown. The cam driver 42 has one or more round holes 44, which are formed through tubular wall thereof. The cam 48 has formed in the cylindrical periphery thereof one or more reciprocal grooves 50, each of which corresponds with a hole 44. A driving ball 62 is retained in each of the holes 44 which drivingly extends through the corresponding helical groove 50 of the cam 48.

If vacuum is not supplied into the vacuum chamber 14, the diaphragm 12 and the cam 48 and associated members will be in the position shown in FIG. 2. If however, vacuum is supplied into the vacuum chamber 14, the diaphragm 12 will move in the direction of the arrow B. Since the cam driver 42 is fixed to the diaphragm 12, it also will move in the direction of the arrow B. The ball or balls 62 will also move in the direction of the arrow B, because they are rotatably received within the corresponding holes 44 in the cam driver 42. The balls 62 will, however, be permitted to move only longitudinally relative to the sleeve 56 because they are received in and guided by the grooves 58. Since the balls 62 are rotatably received in the helical grooves 50 of the cam 48, as the balls 62 move in the direction of the arrow B, they will apply a force to the cam 48 such as to urge the cam 48 to rotate about the axis of the housing 11 and simultaneously move in the direction of the arrow B, due to the configuration of the helical grooves 50. However, since the ball or balls 64 rotatably connect the recesses 60 with the groove 54 of the cam 48, it can be seen that the cam 48 is prevented from moving axially within the housing 11 in the direction of the arrow B. It can also be seen that since the balls 64 are received within the slots 46 formed through the cam driver 42, the cam driver 42 is not prevented from moving axially within the housing 11. However, by selecting the end positions of the slots 46, the axial movement of the cam driver 42 and correspondingly the diaphragm 12 can be maintained within desired limits.

Thus, from the above description of the operation of a device embodying the invention, it can be seen that the cam 48 and correspondingly the output shaft 52 and attached output device rotate to a position determined by the level of pressure supplied into the vacuum chamber 14.

Although the invention has been herein described as having a binary or two position operation in response to a vacuum or atmospheric air input, it is intended that a device of the invention may also provide an analog or continuously variable output in response to any configuration of pressure inputs.

Also, the invention has been described as comprising a cam having helical grooves 50, which provide an angular shaft output substantially proportional to the pressure input. If desired, however, the grooves 50 may be of any shape to provide an output which is any predetermined function of the pressure input, allowing a device of the invention to be used as, for example, an analog computing element or indicating device.

Also, it will be noticed that the output device connected to the shaft 52 may be located closely adjacent to a device of the invention, thus saving overall space, and that the torque applied to the output device from a device of the invention is substantially constant.

What is claimed is:

1. A device for converting a fluid pressure input into a mechanical rotational position output, comprising:
   diaphragm means movable responsive to a fluid pressure input;
   guide means comprising a stationary sleeve;
   cam driver means secured to the diaphragm means for axial movement therewith in response to said input, the cam driver means comprising a tubular slide member, coaxially disposed in said guide means;
   a rotary cam comprising a substantially cylindrical member coaxially disposed in said cam driver means, the cam having a rotary output shaft coaxially extending therefrom;
   there being at least one longitudinal recess and at least one peripheral recess in an inner peripheral wall of said stationary sleeve; at least one round hole and at least one longitudinal hole extending through said tubular slide member; and at least one helical groove and at least one peripheral groove in said cam;
   a spherical driving member retained in a space defined by said longitudinal recess, round hole, and helical groove for causing rotation of said rotary cam in response to reciprocation of said cam driver means; and
   a spherical guiding member retained in a space defined by said peripheral recess, longitudinal hole, and peripheral groove for preventing rotation of said cam driver means, whereby reciprocation of said diaphragm means in response to a fluid pressure input causes rotation of said output shaft.

2. A device according to claim 1 including spring means for axially biasing said diaphragm means and said cam driver means against said fluid pressure input.

* * * * *